March 10, 1953     O. L. BOOTHBY ET AL     2,631,118
METHOD OF PRODUCING SOFT MAGNETIC MATERIALS
Filed Dec. 21, 1949
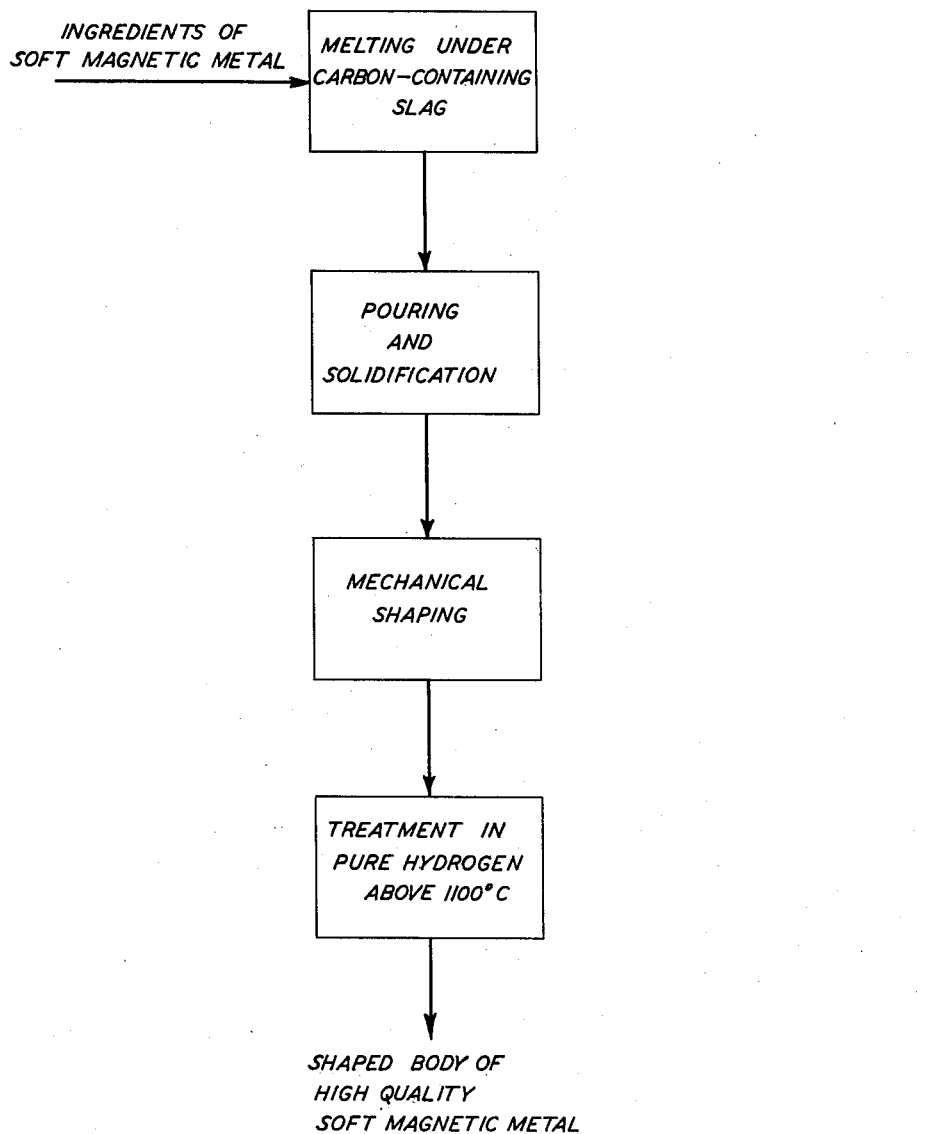
INVENTORS   OTIS L. BOOTHBY
                DANIEL H. WENNY, JR.
BY Edwin B. Cave
ATTORNEY Patented Mar. 10, 1953

2,631,118

UNITED STATES PATENT OFFICE 2,631,118

METHOD OF PRODUCING SOFT MAGNETIC MATERIALS

Otis L. Boothby, Brooklyn, N. Y., and Daniel H. Wenny, Jr., West Orange, N. J., assignors to Bell Telephone Laboratories, Incorporated, New York, N. Y., a corporation of New York Application December 21, 1949, Serial No. 134,346

4 Claims. (Cl. 148—2)

This invention relates to improved methods of producing soft magnetic materials of high permeability.

It has been generally recognized that the presence of even very small amounts of carbon is detrimental to the magnetic properties of soft magnetic metals and for this reason the preparation of iron or iron alloys for uses requiring high permeability and low coercive force has involved procedures for eliminating carbon in so far as possible. Every effort has been made to keep carbon out of these materials by removing any carbon that might be introduced as an impurity either in the raw materials or during processing and avoiding as far as possible its introduction as a contamination from the method of melting.

The procedures now in use for the large scale commercial manufacture of these high permeability metals and alloys are designed to start carbon removal in the first stages of melting. The raw materials are melted, as in a carbon arc furnace, under a cover of a lime slag made highly oxidizing by additions of iron oxide, in the form of ore or mill scale, sufficient to oxidize all of the carbon in the melt.

Most high permeability alloys are made with virgin materials or selected alloy scrap, which might possibly be off composition with regard to the major components but which would not contain appreciable concentrations of undesirable foreign elements, other than carbon, that would need to be oxidized out of the melt. Hence the primary function of the melting under an oxidizing slag in the present commercial practice is the removal of carbon. This carbon removal is accomplished by the reaction, $$FeO + C \rightarrow CO + Fe$$

which occurs as the iron oxide in the slag dissolves in the molten metal. Much of the carbon monoxide produced in the reaction passes off as a gas from the system but substantial quantities remain dissolved in the molten metal.

In the present commercial practice, after the carbon concentration of the melt has been reduced to the required value, which may be about 0.02 per cent, in the oxidizing phase of the melting operation, the oxidizing slag is removed and is replaced by a new slag of lime made reducing by the addition of carbon, as in the form of coke dust. It is the function of this reducing slag to remove the major portion of the iron oxide dissolved in the molten metal during the oxidizing phase, and to remove sulfur from the melt by means of the carbide reactions, $$CaO + 3C \rightarrow CaC_2 + CO$$

$$CaC_2 + FeS \rightarrow CaS_2 + Fe + C$$

The end point of the reaction between the reducing slag and the oxides dissolved in the molten metal is difficult to control. If the melt is held too long under the reducing slag, carbon dissolves in the melt, defeating the purpose of the oxidizing phase. If the melt is poured before deoxidation is complete, the evolution of gases, principally carbon-monoxide, during solidification, produces a spongy porous ingot. To overcome this difficulty, strong deoxidizers such as calcium, magnesium, silicon, and aluminum are added to the melt just before pouring to complete the deoxidation. In that manner a sound ingot with a low carbon content is produced.

Although the problem of gassing is eliminated by the use of these powerful deoxidizers, it has been found that when the final product is subjected to a purifying hydrogen heat treatment to increase the permeability, the effectiveness of this heat treatment is very considerably reduced as a result of the use of these deoxidizers.

The present invention resides in a method of forming these high permeability metallic materials which is considerably simpler and more economical than that described above, which does not involve the careful balance between oxidizing and reducing phases described above, and which does not require the use of deoxidizers having a degrading effect upon the permeability.

The method of the present invention is applicable to those preparations of high permeability bodies wherein, after melting of the metallic composition and formation of the ingot, the body is fabricated in the desired form from the ingot and is then subjected to a high temperature purifying heat treatment in substantially pure hydrogen.

In the method of the present invention the melting of the raw materials is carried out without an oxidizing stage, regardless of the carbon content of the raw materials. Instead the complete melting is carried out under a reducing slag so that the melt not only retains its original carbon but even picks up carbon from the slag. Thus, in the method of the present invention carbon is purposely added to the melt in contradistinction to the usual commercial practice of reducing the carbon content to the lowest possible value.

Since, where the entire melting is carried out under a reducing slag, the melt is never saturated with oxides, there is no need to prevent gassing by adding the strong deoxidizers, such as calcium, silicon, magnesium or aluminum, which cause lowered permeability in the final hydrogen-purified product. The addition of small amounts of manganese alone to the melt is sufficient in those instances where such deoxidation may be required. Manganese does not have the adverse effect upon permeability that the stronger deoxidizers have and in many instances has been found to improve the permeability.

After the ingredients of the high permeability metallic material have been melted as described above, the melt may be poured in air, or under any other desired conditions, and cast into ingots. The ingots will have a composition similar to those produced by the prior commercial practice except that they will have a higher carbon content and will be free from harmful oxides.

In spite of this high carbon content, there is no adverse effect on the permeability of the final product since the subsequent purification by heat treatment in hydrogen is so effective that no more carbon remains after this treatment in the bodies produced by the process of the present invention than in the bodies which were essentially carbon-free prior to the heat treatment. In fact, it can be shown that, although the presence of carbon in the final product is detrimental to permeability, nevertheless the presence of carbon during the melting operation and in the product prior to hydrogen heat treatment results in improved permeability.

This can be shown by melting two small batches of molybdenum permalloy, containing 79 per cent nickel, 5 per cent molybdenum and the remainder iron, separately in an induction furnace under a vacuum, without a slag cover, and adding carbon to one of the batches. When two such batches were melted from essentially carbon-free ingredients and 0.1 per cent of carbon was added to one of the melts but not to the other, the final products were found to possess substantially different values of maximum permeability after casting, rolling to a thin tape, high temperature heat treatment in hydrogen and low temperature heat treatment under such conditions as to produce optimum maximum permeability in each case.

The product of the batch melted without carbon had a maximum permeability of about 1,000,000 whereas the product of the batch to which carbon was added had a maximum permeability of about 1,200,000. Thus the addition of carbon to the melt increased the maximum permeability of the final product by about 20 per cent. It can be postulated that this effect is due to the fact that the presence of the carbon during the melting prevents the formation of well dispersed small particles of highly refractory oxides in the melt, or reduces such oxides if they are initially present, as will be discussed more fully below.

The two comparative batches referred to above were both prepared on a small scale in an induction furnace. In large tonnage commercial practice, the increase in permeability due to the use of the method of the present invention in place of prior commercial practice, is even more striking than in the comparison above where only the effect of the presence of carbon was considered. Using the prior commercial melting practice, with its required use of strong deoxidizers, the maximum permeability obtainable with the above iron-nickel-molybdenum alloy after purification by hydrogen heat treatment (followed by optimum low temperature heat treatment) was of the order of 200,000. Using the method of the present invention, maximum permeabilities have been obtained for this alloy which are well in excess of 1,000,000.

The accompanying drawing represents a flow sheet setting forth the basic steps followed in forming a high quality magnetic article from the initial ingredients of a soft magnetic material. As shown on this flow sheet, these steps consist of melting the initial ingredients under a carbon-containing slag, pouring and solidifying the melt, mechanically forming the resulting ingot into the required shape and finally heat-treating the resulting article in hydrogen at a temperature above 1100° C. to eliminate carbon and other impurities.

The process of the present invention is applicable to the preparation of bodies of any high permeability metallic magnetic material. It is particularly advantageous in offering a simple and practicable method for carrying out on a large tonnage commercial scale the manufacture of extremely high permeability iron-nickel-molybdenum alloys of the type referred to above.

These alloys ordinarily contain between about 2 per cent and about 7 per cent by weight of molybdenum, between about 75 per cent and about 85 per cent nickel, manganese in amounts up to 1 per cent and preferably in amounts of at least 0.2 per cent, and the remainder iron together with incidental impurities. Most commonly the alloys contain between 78 per cent and 80 per cent nickel, between 4 per cent and 6 per cent molybdenum, between 0.4 per cent and 0.8 per cent manganese, and the remainder iron together with incidental impurities.

Such alloys, when prepared by a melting procedure involving the use of strong deoxidizers for deoxidation of the melt, are known as molybdenum permalloy. When prepared by a procedure in which the addition of these strong deoxidizers to an oxygen-containing melt are avoided and in which they are given a high temperature heat treatment in hydrogen to develop their high permeability, they have come to be known by the name "Supermalloy." As indicated above, the alloys prepared without the addition of the strong deoxidizers to an oxide-containing melt have permeabilities very much higher than those prepared with the use of these deoxidizers under these conditions.

This difference appears to arise from the fact that the deoxidizers, such as calcium, silicon, aluminum and magnesium, dissolve in the melt and, while dissolved, are oxidized (in an oxygen-containing or oxide-containing melt) to form extremely fine, well dispersed particles of the respective oxides. These oxides are very difficultly reducible and therefore are not reduced during the high temperature hydrogen heat treatment but remain dispersed throughout the magnetic material where they produce strain in the crystal lattice which prevents the alloy from achieving the high permeability which would be possible in the absence of this strain.

This same effect is present to a greater or less degree in other metallic high permeability materials, depending upon their sensitivity to this type of strain. The process of the present invention permits the avoidance of this type of permeability degradation in large scale melting by providing a feasible method for carrying out such melting without the necessity for using these deoxidizers.

The improvement in permeability due to the presence of carbon during melting is believed to arise from much the same cause. Since carbon is such a powerful reducing agent, it is capable either of preventing the oxidation of the traces of elements of the strong deoxidizer type which may be dissolved in the raw materials or of reducing the finely divided oxides of these materials which may be present in the melt.

Elements which form difficulty reducible oxides and therefore lead to a lowering of permeability when oxidized in the melt are those which have a greater affinity for oxygen than does manganese and which form stable oxides at the temperature of the melt. They are the elements which form oxides having a heat of formation per gram atom of oxygen which is higher than that of the most stable oxide of manganese (MnO) or, in other words, a heat of formation greater than 90 kilogram-calories per gram atom of oxygen entering the oxide. By oxides stable at the temperature of the melt is meant oxides which exist at the temperature in a state other than gaseous.

Although particularly adapted to the manufacture of the iron-nickel-molybdenum alloys, as discussed above, the process of the present invention is adapted to the preparation of any soft magnetic metal composition, and offers the same advantages of economy and simplicity in large scale melting and, in most instances, of increased permeability. Thus the process is adapted to the preparation of soft iron, of iron-silicon alloys, of iron-nickel alloys, of iron-nickel-chromium alloys, of iron-nickel-copper alloys, of iron-nickel-manganese alloys, of iron-nickel-cobalt alloys, of iron-cobalt-vanadium alloys or of any of the other soft magnetic alloys.

As indicated above, the ingredient or ingredients of the composition are melted under a reducing slag. Any conventional slag may be employed, a lime slag being the most convenient. The slag has added to it any amount of carbon which will render it reducing throughout the entire melting operation. Sufficient manganese is added, at any time during the melting operation, to prevent gassing during the pouring of the melt. Preferably, at least 0.2 per cent manganese is added. Larger amounts, up to 1 per cent or 2 per cent or more, may be added if desired. Pouring and casting of the melt may be carried out in air. The ingots are processed in accordance with standard rolling procedures to thin tapes having a thickness, for instance, between about 0.001 inch and 0.015 inch. These tapes are then formed into the desired objects, as, for instance, into spirally wound toroidal cores. If desired, the tapes, prior to formation into the desired objects, may be given a coating of a finely divided refractory insulating material, as by passing the tapes through a suspension of finely divided magnesium oxide in an inert volatile liquid, such as carbon tetrachloride, preferably containing a dispersing agent, such as dioctyl sodium sulfosuccinate in an amount of about 0.1 pound per gallon of liquid, and then allowing the liquid to evaporate.

The high temperature hydrogen heat treatment of these objects is carried out by heating them in an atmosphere of purified hydrogen at a temperature above 1100° C. and below the melting point of the metal or alloy of which they are formed. Commercial electrolytic hydrogen may be prepared for this use by passage over a palladium catalyst, to convert to water any oxygen which is present, followed by passage through a drying chamber containing activated alumina. Hydrogen treated in this manner has a dew point of about −40° C. or lower and is well suited for use in the process of the present invention. The hydrogen atmosphere is maintained in the heat treating furnace by continuous passage of hydrogen through the furnace, with the hydrogen atmosphere in the furnace being maintained most conveniently at atmospheric pressure.

Consistently good results are obtained if the high temperature treatment is carried out in an atmosphere of hydrogen prepared by the method described above. It is obvious, however, that the hydrogen may be prepared by any other desired method which will yield hydrogen of the required purity. The pressure of the hydrogen in the heat treating furnace is not necessarily limited to atmospheric pressure although that is a convenient pressure for ordinary furnace operation.

The greatest improvement in the properties of the alloy is achieved in the shortest time when the temperature is maintained as close to the melting point of the alloy as possible without damaging the structure of the magnetic body. A temperature of about 1300° C. has been found to be desirable, but due to limitations of commercial heat treating furnaces, a temperature of 1150° C. to 1200° C. is more practical. Temperatures substantially below about 1100° C. do not yield the desired properties within a reasonable time.

The time required to accomplish the purification necessary for satisfactory results will depend, of course, upon the initial purity of the alloy, the thickness of the material, and the purity of the hydrogen atmosphere maintained in the furnace, as well as upon the temperature of the heat treatment. Provision must be made to insure an adequate flow of hydrogen throughout the interior of the heat treating chamber of the furnace, and suitable precautions are necessary to avoid contamination of the hydrogen atmosphere by gases evolved from the furnace lining. Under these conditions, and with a rate of flow of hydrogen of about 50 cubic feet per hour per cubic foot of space in the heat treating chamber, satisfactory results have been obtained consistently, with the time of heat treatment depending upon the thickness and the temperature. At 1300° C., about two hours has been found to be sufficient for 0.001 inch thick material and about 20 hours for 0.014 inch thick material. Longer times are required at lower temperatures.

After the high temperature hydrogen heat treatment, the bodies may be subjected to the low temperature heat treatment which is required to develop the desired magnetic properties of the alloy of which they are formed.

The invention has been described in terms of its specific embodiments and since modifications and equivalents will be apparent to those skilled in the art, this description is intended to be illustrative of, and not to constitute a limitation upon, the scope of the invention.

What is claimed is:

1. The method of producing a soft magnetic metal body which comprises melting the ingredients of the composition of which said body is formed, maintaining a slag, made reducing by the presence of carbon, over the melt throughout substantially the entire melting operation, maintaining the melt essentially free of elements which are capable of forming an oxide which is stable at the temperature of the melt and which has a heat of formation greater than 90 kilogram-calories per gram atom of oxygen entering the oxide, adding manganese to the ingredients of the melt at some time during the melting operation in an amount sufficient to prevent gassing during the subsequent solidification of the melt, forming a solid body from said melt and subjecting said body in an atmosphere of hydrogen to a temperature above 1100° C. and below the melting point of the composition of which said body is formed until the composition is essentially free of carbon.

2. The method as described in claim 1 wherein the manganese is added to the ingredients of the melt in an amount between 0.2 per cent and 2 per cent by weight and wherein the heating of the body in hydrogen is carried out at temperatures between 1150° C. and 1300° C.

3. The method as described in claim 2 wherein the composition of which the body is formed is made up of between 75 per cent and 85 per cent nickel, between 2 per cent and 7 per cent molybdenum, up to 2 per cent manganese and the remainder iron together with incidental impurities.

4. The method of forming a toroidal magnetic core comprising melting together the ingredients of an alloy consisting of approximately 79 per cent nickel, approximately 5 per cent molybdenum, approximately 0.5 per cent manganese and the remainder iron together with incidental impurities, maintaining a carbon-containing reducing slag over the melt throughout substantially the entire melting operation, maintaining the melt essentially free of elements which are capable of forming an oxide which is stable at the temperature of the melt and which has a heat of formation greater than 90 kilogram-calories per gram atom of oxygen entering the oxide, forming a solid body of said alloy, forming said body into a thin tape, spirally winding said tape into a toroidal core and heat treating said core at a temperature between about 1150° C. and about 1300° C. in an atmosphere of dry hydrogen for at least about one hour.

OTIS L. BOOTHBY.
DANIEL H. WENNY, Jr.

REFERENCES CITED

The following references are of record in the file of this patent:

UNITED STATES PATENTS

| Number | Name | Date |
| --- | --- | --- |
| 399,010 | Brandreth | Mar. 5, 1889 |
| 837,682 | Hadfield | Dec. 4, 1906 |
| 1,869,025 | Seastone | July 26, 1932 |
| 2,558,104 | Scharschu | June 26, 1951 |

OTHER REFERENCES

Metals Handbook, published by American Society for Metals, Cleveland, Ohio, 1948, pages 587, 590, 591 and 1028–1029.